Oct. 14, 1930.                A. E. PROCTOR                1,778,275
                        BAND SAW TENSIONING ROLLER
                        Filed Nov. 30, 1928          2 Sheets-Sheet 1
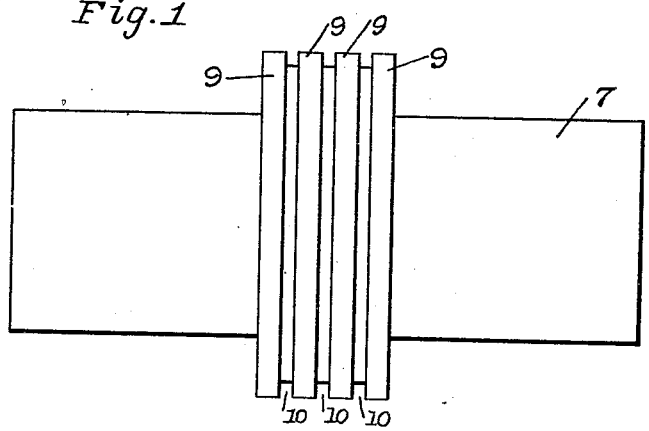
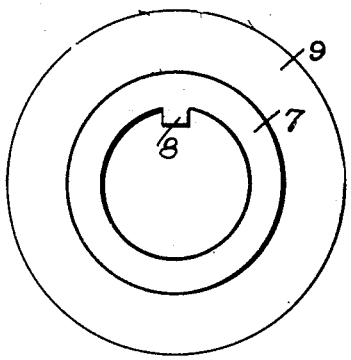
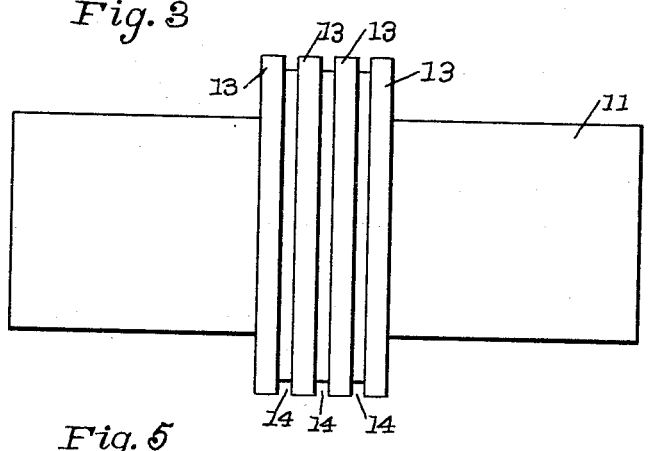
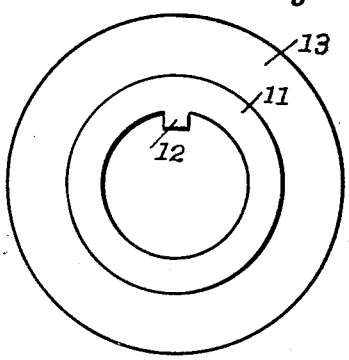
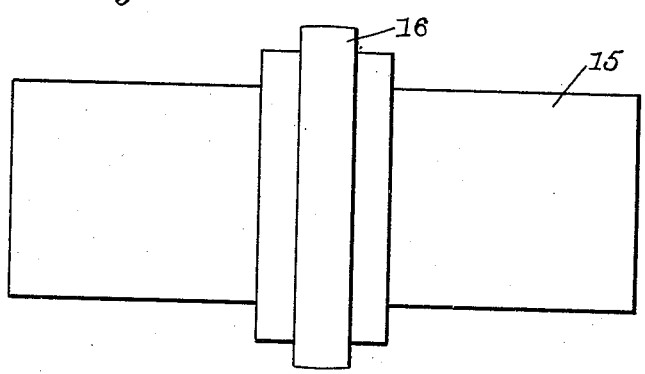
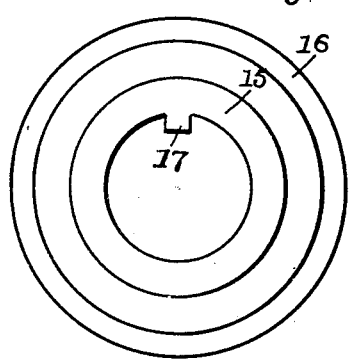
INVENTOR,
Albert E. Proctor.
BY David E. Lain,
ATTORNEY.

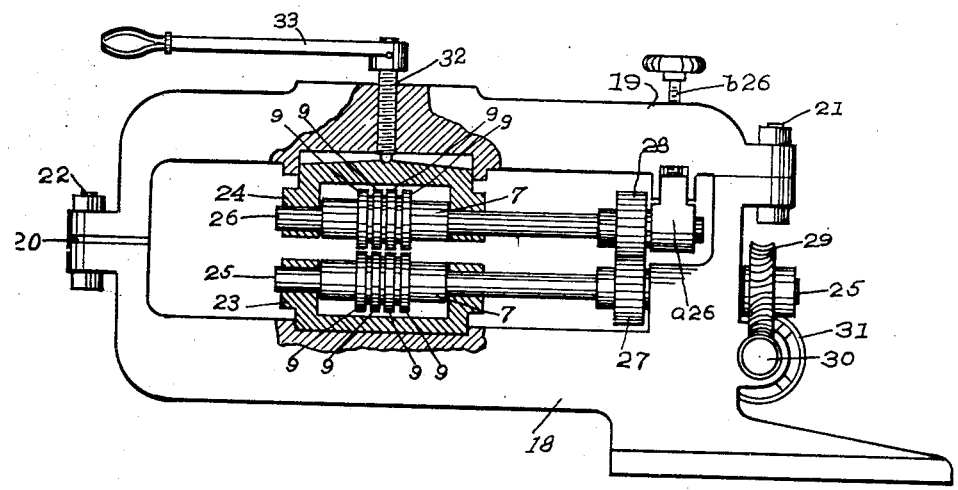

Patented Oct. 14, 1930

1,778,275

UNITED STATES PATENT OFFICE

ALBERT E. PROCTOR, OF BELLINGHAM, WASHINGTON

BAND-SAW-TENSIONING ROLLER

Application filed November 30, 1928. Serial No. 322,760.

My invention relates to improvements in band saw tensioning rollers.

For head saws in modern northwest lumber mills band saws are used. They are run at high speed under tension sufficient to elongate the bands to an appreciable extent.

These saws must cut logs not unfrequently more than five feet in diameter which may have knots therein many times harder than the surrounding wood. Wide and thick bands of steel, bands of steel carefully selected and tempered for the purpose, are required to withstand the strains which must be resisted. Yet always it is desirable that these bands be as thin and flexible as practicable that the saws be not self destructive in operation.

To secure the true running of these large bands under varying deflecting forces the central area of the saw is lengthened to cause its transverse cross section to be curved when not under strain. This lateral curvature is only of an amount which may be entirely removed by the operative saw tension. That is, while the saw is under the strain of the band wheels over which it runs, this lateral curvature is entirely removed by the stretching of its edges under said strain.

This transverse-section curvature is produced by thinning the central area and this thinning had better be as evenly as possible. Also, it is desirable to have said transverse curvature greater near the tooth edge than near the back edge of the saw, when a single-cutting saw is considered.

The reduction in thickness is best done between short annular peens under heavy pressure. Furthermore, it is desirable that the means used to diminish the thickness of said central area operate to make the metal therefore of fibrous longitudinally of the saw rather than transversely thereof.

My improvement has for an object to provide band saw tensioning rollers which will stretch the central area of said bands longitudinally with less lateral stretching than by those heretofore used.

Another object of my improvement is to provide such rollers adapted to stretch a greater width of said area than those used heretofore under no greater pressure.

Another object of my improvement is to provide said rollers suited to stretch greater widths of said area at one time than heretofore with no more care.

Other objects of my improvement will appear as the description proceeds.

I attain these and other objects of my improvement with the mechanism illustrated in the accompanying two sheets of drawings, forming a part of this specification, in which Figure 1 is a side elevation of one of a similar pair of my new cylindrical peening rollers, Fig. 2 is an end elevation of Fig. 1, Fig. 3 is a side elevation of one of a similar pair my now crowned peening rollers, Fig. 4 is an end elevation of Fig. 3, Fig. 5 is a side elevation of a crowned peening roller of the usual type. Fig. 6 is an end elevation of Fig. 5, and Fig. 7 is a side elevation of a band-saw roller press having a pair of my improved rollers mounted therein.

Similar characters refer to similar parts throughout. Certain parts are broken away to show other parts hidden thereby.

With more particular reference to the designated parts: In Figs. 1 and 2, one of sleeves 7 with spline 8 is suited to mount on each of roller shafts 25 and 26 of the roller press, with said spline in engagement therewith, to revolve with said shafts.

On sleeve 7 is fixed cylindrical roller 9 concentric therewith. Roller 9 is preferably subdivided into four parts by annular grooves 10, 10, 10 therein. The subdivisions 9, 9, 9, 9 constituting a gang of annular peens are of equal diameter with cylindrical periphery.

In Figs. 3 and 4 one of sleeves 11 with spline 12 is suited to mount on each of said roller shafts of said press with said spline in engagement therewith for revolution with said shaft. On sleeve 11 is fixed roller 13 concentric therewith. Roller 13 is subdivided into four parts by annular grooves 14, 14, 14 therein. Roller subdivisions 13, 13, 13, 13 are of equal diameter and have their peripheries crowned.

In Figs. 5 and 6 one of sleeves 15 with spline 17 is suited to mount on each of said roller-press shafts with said spine engaged therewith for revolution with the shaft. On sleeve 15 is fixed roller 16 concentric therewith. Roller 16 has its periphery crowned and is the usual kind of roller employed for the stated object as above noted.

The curvatures illustrated in crowned rollers 13, 13, 13, 13 and 16 are drawn with a much shorter radius than in practice in order to be more noticeable. A radius of from 10 to 15 inches being usual.

In Fig. 7, 18 and 19, respectively, indicate the lower and upper parts of the press frame of a simplified roller press having my improved rollers mounted therein to form a part thereof. These frame parts are held together by clamping bolts 21 and 22, the latter of which, including intervening shim 20, must be removed when a band saw is placed in or taken from the press. Lower shaft-bearing housing 23 is engaged in a recess in the lower frame and upper shaft-bearing housing 24 is engaged in a recess in the upper frame. Lower roller shaft 25 is mounted for revolution in the bearings of housing 23 and in a bearing in the lower frame and has driving spur gear 27 and worm wheel 29 fastened thereon for revolution therewith. Upper roller shaft 26 is mounted for revolution in bearings in housing 24 and in bearing $a^{26}$ slidably engaged in the upper frame and controlled by screw $b^{26}$ bearing thereon. Shaft 26 has spur gear 28 fastened thereon to revolve therewith of equal diameter with spur gear 27 with which it is engaged. The shaft of a worm 30 is mounted for revolution in a bearing in the lower frame disposed to engage worm wheel 29 with the worm. Drive pulley 31 is fastened on the worm shaft. Upper housing 24 is controlled by screw 32 engaged in the upper frame and having handle 33 fastened thereto.

Each of shafts 25 and 26 has a slot therein (not shown) in which splines 8 or 12 of sleeves 7 or 11, respectively, may engage. As illustrated, a roller consisting of sleeve 7 and subdivided peen 9 is mounted on each of shafts 25 and 26 between the bearings of housings 23 and 24, respectively, to revolve with the shafts. The construction provides that power applied to pulley 31 to revolve the same will cause subdivided peens 9, 9 to revolve in rolling relation and a saw placed between the peens may be caused to pass therebetween and be stretched thereby when pressure is applied by screw 32. Meanwhile screw $b^{26}$ may be used to align bearing $a^{26}$ with the bearings of housing 24.

In practice I have used rollers of the same dimensions as said 16 but with cylindrical peripheries and have attained greater flexibility of the rolled band but they enter the steel to a lesser depth than do the crowned shape under the same pressure requiring a longer time to complete the work. But in practice I prefer and use an upper and lower gang of short cylindrical rollers like 9 in Figs. 1 and 2 which bed in the steel under the usual pressures and produce a nearly plane area of elongation with little lateral stretching in much less time than is required to produce an area of the same width with rollers 16. Furthermore bands rolled by my new rollers are more flexible than those on which the usual rollers are used unless much more time is taken for the work.

The gang of short crowned rollers 13 shown in Figs. 3 and 4 bed down in the steel with less pressure than do rollers 9 and they are of a useful shape but I prefer the shape of rollers 9 thereto.

Having thus disclosed my invention, what I claim as new therein and desire to secure by Letters Patent is,—

A band saw rolling press including two similar sleeves each having a gang of spaced annular peens thereon said sleeves adapted to be mounted on two parallel shafts of the press for revolution therewith.

ALBERT E. PROCTOR.